(12) United States Patent
George et al.

(10) Patent No.: US 8,868,770 B2
(45) Date of Patent: Oct. 21, 2014

(54) SYSTEM AND METHOD FOR COMMUNICATION PROTOCOL MAPPING

(75) Inventors: Richard George, Waterloo (CA); Brian Oliver, Fergus (CA); Dalsu Lee, Thornhill (CA); Lap Luu, Markham (CA); Andrew Allen, Mundelein, IL (US)

(73) Assignee: BlackBerry Limited, Waterloo (CA)

( * ) Notice: Subject to any disclaimer, the term of this patent is extended or adjusted under 35 U.S.C. 154(b) by 382 days.

(21) Appl. No.: 11/961,374

(22) Filed: Dec. 20, 2007

(65) Prior Publication Data

US 2009/0006637 A1 Jan. 1, 2009

Related U.S. Application Data

(60) Provisional application No. 60/947,235, filed on Jun. 29, 2007.

(51) Int. Cl.
*G06F 15/16* (2006.01)
*H04L 29/06* (2006.01)
*H04L 29/08* (2006.01)

(52) U.S. Cl.
CPC ......... *H04L 67/2823* (2013.01); *H04L 67/2809* (2013.01); *H04L 69/08* (2013.01); *H04L 65/1033* (2013.01); *H04L 67/28* (2013.01)
USPC ............ 709/230; 709/217; 709/227; 709/228

(58) Field of Classification Search
CPC ..... H04L 69/08; H04L 67/2823; H04L 67/28; H04L 67/2809
See application file for complete search history.

(56) References Cited

U.S. PATENT DOCUMENTS

| 6,108,406 | A  | * | 8/2000  | Mitchell et al. ............. 379/93.25 |
| 6,496,865 | B1 |   | 12/2002 | Sumsion et al. |
| 6,549,937 | B1 | * | 4/2003  | Auerbach et al. ............. 709/206 |

(Continued)

FOREIGN PATENT DOCUMENTS

| WO | 03/061242 A1   | 7/2003 |
| WO | 2004028090     | 4/2004 |
| WO | 2005/032090 A1 | 4/2005 |
| WO | 2006/071468 A2 | 7/2006 |

OTHER PUBLICATIONS

Rosenberg, J., Schulzrinne, H., Camarillo, G., Johnston, A., Peterson, J., Sparks, R., Handley, M., and E. Schooler, "SIP: Session Initiation Protocol", RFC 3261, Jun. 2002, total of 240 pages. Retrieved from ftp://ftp.rfc-editor.org/in-notes/rfc3261.txt on Sep. 24, 2007.

(Continued)

*Primary Examiner* — Thomas Dailey
*Assistant Examiner* — Nam Tran
(74) *Attorney, Agent, or Firm* — Novak Druce Connolly Bove + Quigg LLP

(57) ABSTRACT

Systems and methods are provided for protocol mapping. According to an embodiment of the application, the protocol mapping is based on a non-compiled editable file (e.g. XML file) that describes the protocol mapping. Therefore, the protocol mapping can be updated by updating the non-compiled editable file without updating any compiled software. This allows the protocol mapping to be updated to reflect any changes to communication protocols that may occur without having to update any compiled software. Difficulties traditionally associated with updating protocol mappings can be avoided by not having to update compiled software.

13 Claims, 8 Drawing Sheets

(56) References Cited

U.S. PATENT DOCUMENTS

| | | | |
|---|---|---|---|
| 6,594,700 | B1 | 7/2003 | Graham et al. |
| 6,757,722 | B2* | 6/2004 | Lonnfors et al. ............... 709/220 |
| 7,533,381 | B2 | 5/2009 | Ando |
| 7,584,244 | B2 | 9/2009 | Forstadius |
| 2002/0143641 | A1 | 10/2002 | Thomas et al. |
| 2004/0111525 | A1 | 6/2004 | Berkland et al. |
| 2004/0267942 | A1* | 12/2004 | Maes ........................... 709/228 |
| 2005/0055577 | A1 | 3/2005 | Wesemann et al. |
| 2005/0083916 | A1* | 4/2005 | Itagaki et al. ................. 370/352 |
| 2005/0091362 | A1 | 4/2005 | Shigeta |
| 2005/0117183 | A1 | 6/2005 | Adlakha |
| 2006/0129646 | A1 | 6/2006 | Rhee et al. |
| 2006/0140199 | A1 | 6/2006 | Ma et al. |
| 2006/0190526 | A1* | 8/2006 | Neil et al. ..................... 709/203 |
| 2006/0190569 | A1 | 8/2006 | Neil et al. |
| 2006/0195613 | A1 | 8/2006 | Aizu et al. |
| 2007/0067471 | A1 | 3/2007 | Wolfe et al. |
| 2008/0250430 | A1 | 10/2008 | Salgado |
| 2009/0006638 | A1 | 1/2009 | George |
| 2009/0265434 | A1 | 10/2009 | Benc et al. |
| 2010/0259788 | A1 | 10/2010 | Sakuda et al. |
| 2010/0325609 | A1 | 12/2010 | Windley |

OTHER PUBLICATIONS

JAVA Telephony Specification (JTAPI) 1.3, total of 1191 pages. Retrieved from http://java.sun.com/products/jtapi/index.jsp on Jun. 13, 2007.

Voice Browser Call Control: CCXML Version 1.0, total of 205 pages. Retrieved from http://www.w3.org/TR/ccxml on Jun. 13, 2007.

Bushmitch et al., "A SIP-based Device Communication Service for OSGi Framework," First IEEE Consumer Communications and Networking Conference, Jan. 5-8, 2004, pp. 453-458.

Supplementary European Search Report for European Patent Application No. 07855563.8 dated Jul. 16, 2009.

European Search Report and European Search Opinion that issued on Nov. 30, 2009 from related European Patent Application No. 07855562.0.

Office Action from related U.S. Appl. No. 11/961,413.

English-language translation of an Office Action dated Aug. 24, 2011 from corresponding Chinese Patent Application No. 200780036636.X.

Heidi-Maria Rissanen et al: "Design and Implementation of a RESTful IMS API", Wireless and Mobile Communications (ICWMC), 2010 6th International Conference on, IEEE, Piscataway, NJ, USA. Sep. 20, 2010, pp. 86-91, XP031795973, ISBN: 978-1-4244-8021-0.

Jain M et al: "The IMS 2.0 Service Architecture", Next Generation Mobile Applications, Services and Technologies, 2008. NGMAST '08. The Second International Conference on, IEEE, Piscataway, NJ, USA, Sep. 16, 2008, pp. 3-9, XP031409648, ISBN: 978-0-7695-3333-9.

Extended European Search Report dated Feb. 22, 2013 from European Application No. EP 12 15 3949.8.

Office Action dated Oct. 1, 2010 from related U.S. Appl. No. 11/961,413.

* cited by examiner

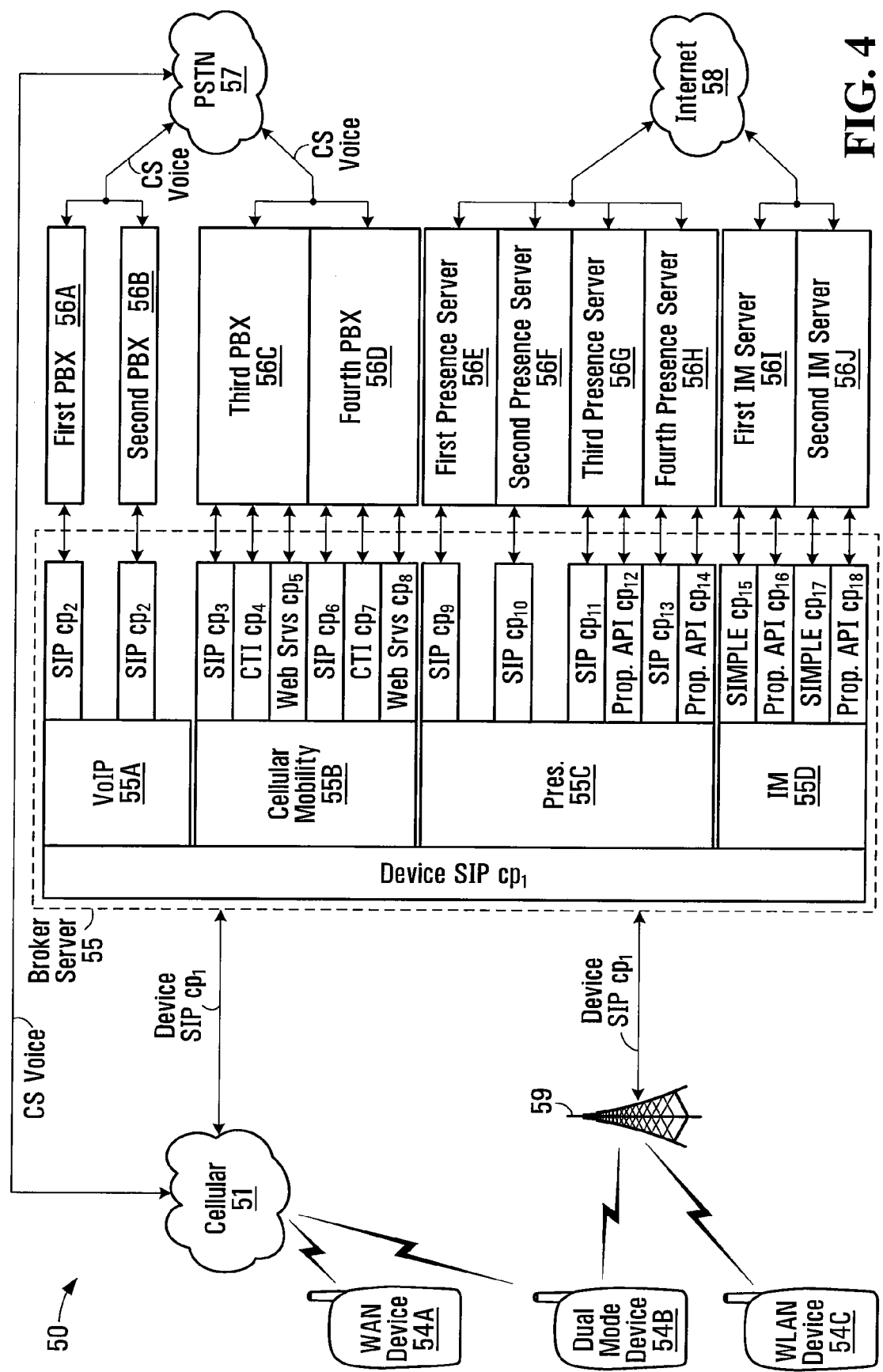

SYSTEM AND METHOD FOR COMMUNICATION PROTOCOL MAPPING

RELATED APPLICATION

This application claims benefit from U.S. Provisional Patent Application No. 60/947,235 filed on Jun. 29, 2007, the disclosure of which is hereby incorporated by reference in its entirety.

COPYRIGHT NOTICE

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

FIELD OF THE APPLICATION

The application relates to communication protocols, and more particularly to mapping between communication protocols.

BACKGROUND OF THE APPLICATION

Many enterprises are replacing their existing CENTREX (Central Exchange) or PBX (Private Branch Exchange) based telephony systems with VoIP (Voice over IP (Internet Protocol)) systems based upon SIP (Session Initiation Protocol) signalling systems. Such systems utilize existing IP infrastructure based upon LAN (Local Area Network) and WLAN (Wireless Local Area Network) technologies.

At the same time, mobile phones that use Cellular networks such as GSM (Global System for Mobile Communications), CDMA (Code Division Multiple Access) and UMTS (Universal Mobile Telecommunications System), to conduct communications with others inside and outside the enterprise network, are being enhanced to provide SIP based communications, including VoIP, over WLAN access, allowing these devices to provide mobile telephony communication capability when within the enterprise network as well as when away from the enterprise network.

Although systems based on SIP are being widely deployed as the common signalling protocol for VoIP telephony, there is a lack of standardization in the way SIP is utilized. Also, the protocol continues to be developed further with continued introduction of new extensions to SIP. This has led to different versions of SIP with significant differences in the way they are used. These differences include the usage of different SIP headers for conveying the same information or to trigger the same action, different call scenarios (different message sequences) for the same call setup or call feature, the use of proprietary or pre-standard SIP headers, and the use of new extensions to the SIP standards.

These differences create a problem for manufacturers of mobile devices such as mobile phones. Mobile phones manufactured with a version of SIP software that implements an early version of SIP may be sold and attempted to be used on a network that requires a version of SIP software that implements a later SIP standard. It may not be economically viable for vendors of such mobile devices to produce different SIP software for every potentially deployed network SIP usage.

As more versions of SIP are in use it becomes more important for network providers to provide mappings between the various versions. Moreover, it becomes important to be able to map SIP to other communication protocols such as Hyper Text Transfer Protocol 'HTTP'. A protocol mapping might be updated each time a new version of SIP is introduced, or whenever a mapping is to be provided for another existing protocol. However, this might result in the protocol mapping being updated very frequently, which can be inconvenient and impractical.

BRIEF DESCRIPTION OF THE DRAWINGS

Embodiments will now be described with reference to the attached drawings in which:

FIG. 4 is a block diagram of another example wireless system;

DETAILED DESCRIPTION OF EMBODIMENTS

Some embodiments of the application provide for a system and method whereby a protocol mapping is based on a non-compiled editable file describing the protocol mapping. The protocol mapping can be updated without updating compiled software. Therefore, difficulties traditionally associated with updating the protocol mapping can be avoided by not having to update compiled software.

According to a broad aspect of the application, there is provided a method of mapping communication between an application of a communications device and an application server of a communications network, the method comprising: maintaining a protocol mapping between a first communication protocol used by the application of the communications device and a second communication protocol used by the application server, the protocol mapping being based on a non-compiled editable file describing the protocol mapping; mapping communication between the application of the communications device and the application server using the protocol mapping; and updating the protocol mapping by updating the non-compiled editable file without updating any compiled software.

According to another broad aspect of the application, there is provided a computer readable medium having computer executable instructions stored thereon for execution on a processor so as to implement the method summarised above.

According to another broad aspect of the application, there is provided an apparatus comprising: a processor; and a protocol mapping function for: maintaining a protocol mapping between a first communication protocol used by an application of a communications device and a second communication protocol used by an application server, the protocol mapping being based on a non-compiled editable file describing the protocol mapping; mapping communication between the application of the communications device and the application server using the protocol mapping; and updating the protocol mapping by updating the non-compiled editable file without updating any compiled software.

System for Communication Protocol Mapping

Figure 1A:
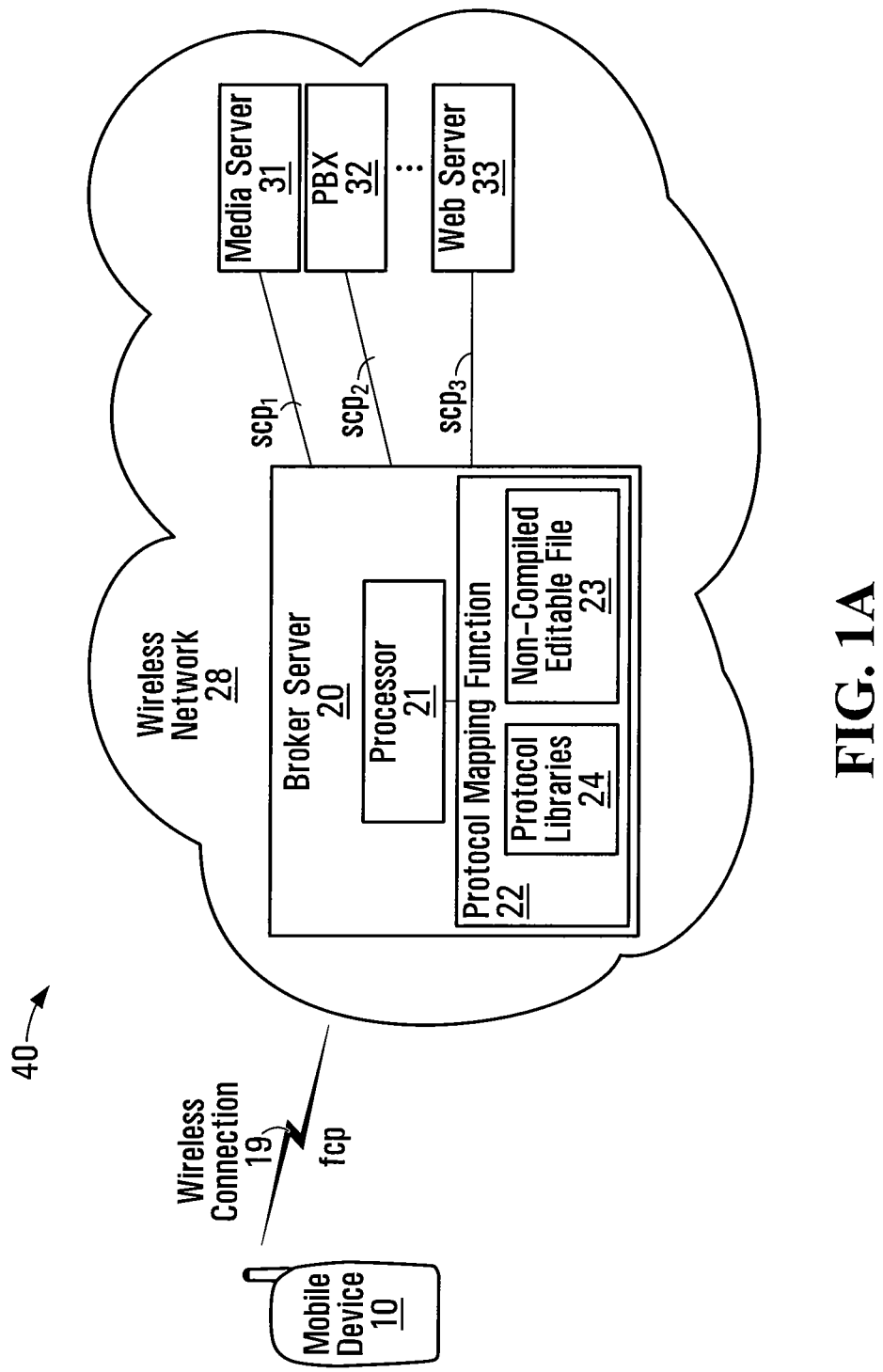
FIGS. 1A and 1B are block diagrams of example wireless systems.

Referring now to FIG. 1A, shown is a block diagram of an example wireless system 40. The wireless system 40 has a wireless network 28 and a mobile device 10. The wireless network 28 has a broker server 20, and a plurality of application servers 31,32,33. In the illustrated example, the application servers 31,32,33 include a media server 31, a Private Branch exchange 'PBX' 32, and a web server 33. The wireless system 40 might have other components (not shown), for example additional mobile devices and/or additional application servers. The broker server 20 has a processor 21 and protocol mapping function 22. The protocol mapping function 22 has a non-compiled editable file 23, and protocol libraries 24. The broker server 20 may have other components, but they are not shown for sake of simplicity.

In operation, the mobile device 10 communicates with the wireless network 28 over a wireless connection 19 between the mobile device 10 and the wireless network 28. The communication with the wireless network 28 might for example be with one of the application servers 31,32,33. In the illustrated example, the mobile device 10 communicates using a first communication protocol fcp, while each application server 31,32,33 uses a respective second communication protocol $scp_1,scp_2,scp_3$. Therefore, communication between the mobile device 10 and the application servers 31,32,33 involves mapping of communication protocols.

In the illustrated example, the mapping of communication protocols is performed by the broker server 20 of the wireless network 28. The protocol mapping function 22 operates to maintain a protocol mapping between the first communication protocol fcp used by the mobile device 10 and each second communication protocol $scp_1,scp_2,scp_3$ used by the application servers 31,32,33. The protocol mapping is used to map communication between the mobile device 10 and the application server 31,32,33 that is in communication with the mobile device 10. The protocol libraries 24 provide basic building blocks for using the communication protocols fcp, $scp_1,scp_2,scp_3$.

According to an embodiment of the application, the protocol mapping is based on the non-compiled editable file 22, which describes the protocol mapping. A specific example for the non-compiled editable file 22 is an Extensible Markup Language 'XML' file. Alternative implementations might employ any appropriate proprietary language, which might for example be a markup language. Since the protocol mapping is based on the non-compiled editable file 22, the protocol mapping can be updated by updating the non-compiled editable file 23 without updating any compiled software. This allows the protocol mapping to be updated to reflect any changes to the communication protocols $fcp,scp_1,scp_2,scp_3$ that may occur without having to update any compiled software.

In the illustrated example, the protocol mapping function 22 is implemented as software and is executed on the processor 21. However, more generally, the protocol mapping function 22 may be implemented as software, hardware, firmware, or any appropriate combination thereof. Note that appropriate combinations involve the non-compiled editable file 23 of the protocol mapping function 22 to be software implemented. The non-compiled editable file 23 might for example be in an American Standard Code for Information Interchange 'ASCII' format. Other software implementations are possible for the non-compiled editable file 23.

In specific software implementations, the JAVA programming language and the JAVA Application Programmer Interface (API) are used. This allows Call Processing Applications to be developed that can run on multiple platform architectures and that can run using different call signalling protocols. For example, the Java Telephony API (JTAPI) 1.3 provides a set of APIs that can be used to implement both the basic call model and also advanced call features. Other software implementations can include C, C++, Pascal, Perl, etc. Note that software implementations can be compiled (e.g. C, C++, Pascal), or interpretative (e.g. Perl).

It is to be understood that the libraries 24 of the protocol mapping function 22 are completely optional. The basic building blocks for using the communication protocols fcp, $scp_1,scp_2,scp_3$ might be implemented within the protocol mapping function 22 in any appropriate manner, or provided to the protocol mapping function 22 by some component external to the protocol mapping function 22.

In the example described above with reference to FIG. 1A, the protocol mapping is performed by the broker server 20 of the wireless network 28. In another embodiment, the protocol mapping is performed by the mobile device itself. In this manner, the mobile device operates as a broker server. An example is provided below with reference to FIG. 1B.

Figure 1B:
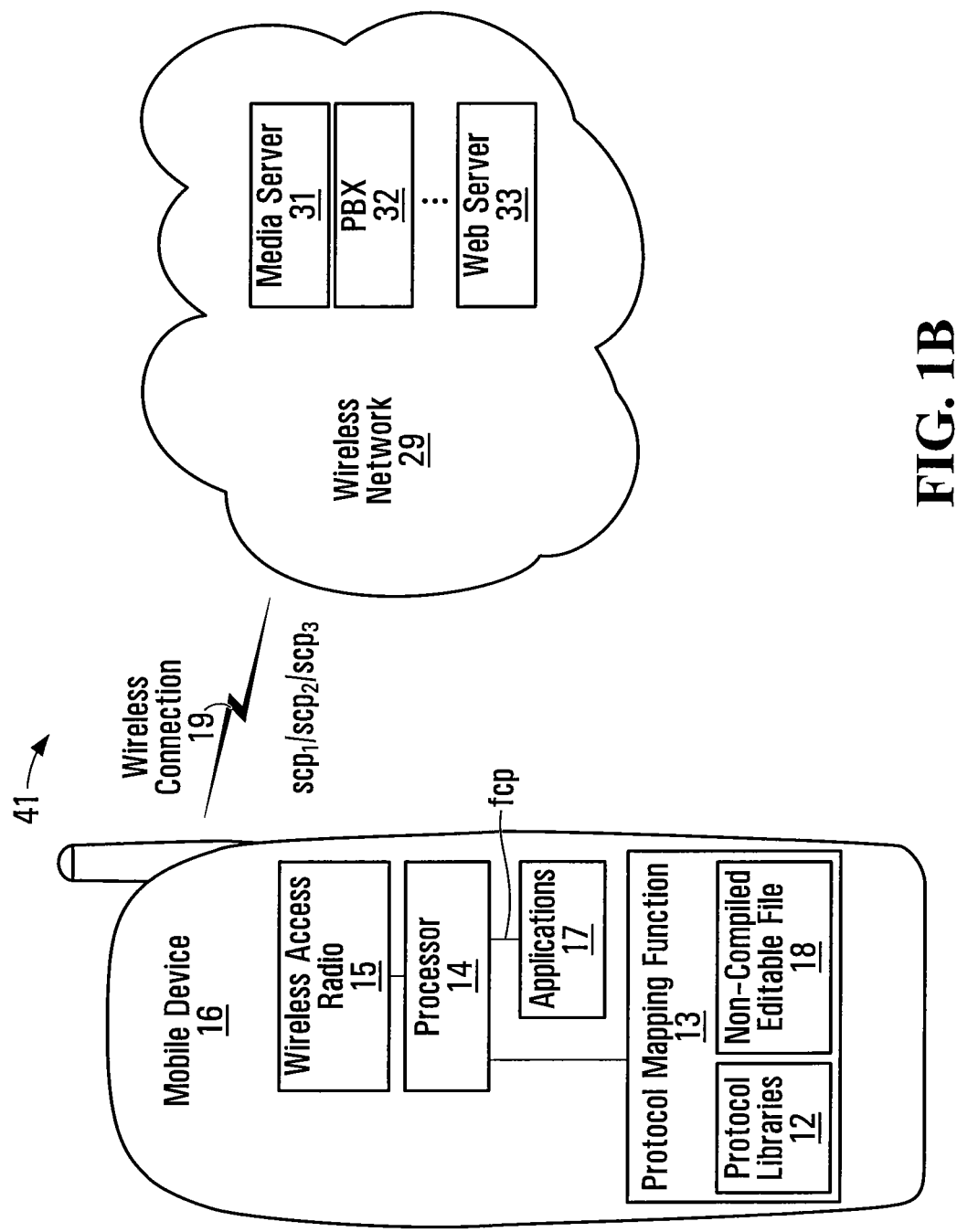

Referring now to FIG. 1B, shown is a block diagram of another example wireless system 41. The wireless system 41 has a wireless network 29 and a mobile device 16. The wireless network 29 has application servers 31,32,33 much like those of the wireless network 28 of FIG. 1A. The wireless system 40 might have other components (not shown), for example additional mobile devices and/or additional application servers. Note that the wireless network 29 is shown without a broker server, as functionality of the broker server is implemented as part of the mobile device 16. The mobile device 16 has a processor 14 connected to a wireless access radio 15, a protocol mapping function 13, and applications 17. The connections between the processor 14 and the other components 15,13,17 may be direct connections or indirect connections in which there is one or more intervening component (not shown). The protocol mapping function 13 has a non-compiled editable file 18, and protocol libraries 12. The mobile device 16 may have other components, but they are not shown for sake of simplicity.

In operation, the mobile device 16 communicates with the wireless network 29 using its wireless access radio 15. The wireless communication is over a wireless connection 19 between the mobile device 16 and the wireless network 29. The communication with the wireless network 29 might for example be between one of the applications 17 of the mobile device 16 and one of the application servers 31,32,33. In the illustrated example, the applications 17 use the first communication protocol fcp, while each application server 31,32,33 uses the respective second communication protocol $scp_1, scp_2,scp_3$. Therefore, communication between the applications 17 and one of the application servers 31,32,33 involves mapping of communication protocols.

In the illustrated example, the mapping of communication protocols is performed by the mobile device 16. The protocol mapping function 13 operates to maintain a protocol mapping between the first communication protocol fcp used by the applications 17 of the mobile device 16 and the second communication protocol $scp_1,scp_2,scp_3$ used by the application server 31,32,33 in communication with the mobile device 16. The protocol mapping is used to map communication between the application 17 of the mobile device 16 and the application server 31,32,33 that is in communication with the mobile device 16. The protocol libraries 12 provide basic building blocks for using the communication protocols fcp, $scp_1,scp_2,scp_3$.

According to an embodiment of the application, the protocol mapping is based on the non-compiled editable file 18, which describes the protocol mapping. A specific example for the non-compiled editable file 18 is an XML file. Alternative implementations might employ any appropriate proprietary language, which might for example be a markup language.

Since the protocol mapping is based on the non-compiled editable file 18, the protocol mapping can be updated by updating the non-compiled editable file 18 without updating any compiled software. This allows the protocol mapping to be updated to reflect any changes to the communication protocols fcp,$scp_1$,$scp_2$,$scp_3$ that may occur without having to update any compiled software.

In the illustrated example, the protocol mapping function 13 is implemented as software and is executed on the processor 14. However, more generally, the protocol mapping function 13 may be implemented as software, hardware, firmware, or any appropriate combination thereof. Note that appropriate combinations involve the non-compiled editable file 18 of the protocol mapping function 13 to be software implemented. The non-compiled editable file 18 might for example be in an American Standard Code for Information Interchange 'ASCII' format. Other software implementations are possible for the non-compiled editable file 18.

In specific software implementations, the JAVA programming language and the JAVA Application Programmer Interface (API) are used. This allows Call Processing Applications to be developed that can run on multiple platform architectures and that can run using different call signalling protocols. For example, the Java Telephony API (JTAPI) 1.3 provides a set of APIs that can be used to implement both the basic call model and also advanced call features. Other software implementations can include C, C++, Pascal, Perl, etc. Note that software implementations can be compiled (e.g. C, C++, Pascal), or interpretative (e.g. Perl).

It is to be understood that the libraries 12 of the protocol mapping function 13 are completely optional. The basic building blocks for using the communication protocols fcp, $scp_1$,$scp_2$,$scp_3$ might be implemented within the protocol mapping function 13 in any appropriate manner, or provided to the protocol mapping function 13 by some component external to the protocol mapping function 13.

The illustrated examples presented above with reference to FIGS. 1A and 1B each involve a wireless network. It is to be understood that the wireless networks would have any appropriate components suitable for a wireless network. Note that the wireless networks may include wires in spite of having components for wireless communication. The components of each wireless network is implementation specific and may depend on the type of wireless network. There are many possibilities for the wireless network. The wireless network might for example be a Data Wide Network, an 802.11 Wireless Fidelity 'Wi-Fi' network, an 802.16 Worldwide Interoperability for Microwave Access 'WiMAX' network, or a cellular network. Examples of appropriate cellular networks include an Enhanced Data rates for GSM Evolution 'EDGE' network, a Code Division Multiple Access 'CDMA' network, and a Universal Mobile Telecommunications System 'UMTS' network. Although the examples presented above focus on wireless communication, it is to be understood that embodiments of the invention are also applicable to non-wireless communication systems. In such embodiments, communication devices may be provided in place of mobile devices. Note that there is no need for such communication devices to have wireless access radios for wireless communication.

Further details of the protocol mapping are provided below with reference to FIGS. 2 through 5.

Method for Communication Protocol Mapping

Figure 2:
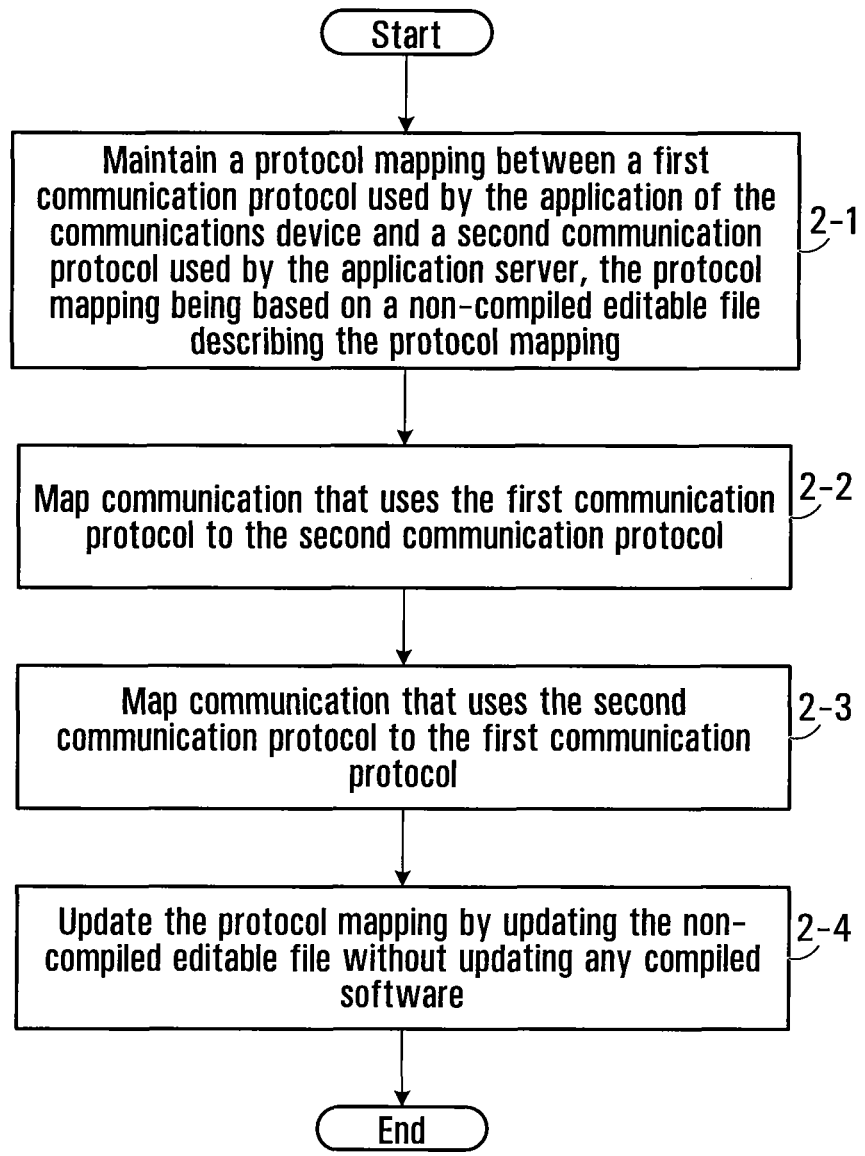
FIGS. 2 and 3 are flowcharts of example methods of mapping communication between an application of a communications device and an application server.
Figure 3:
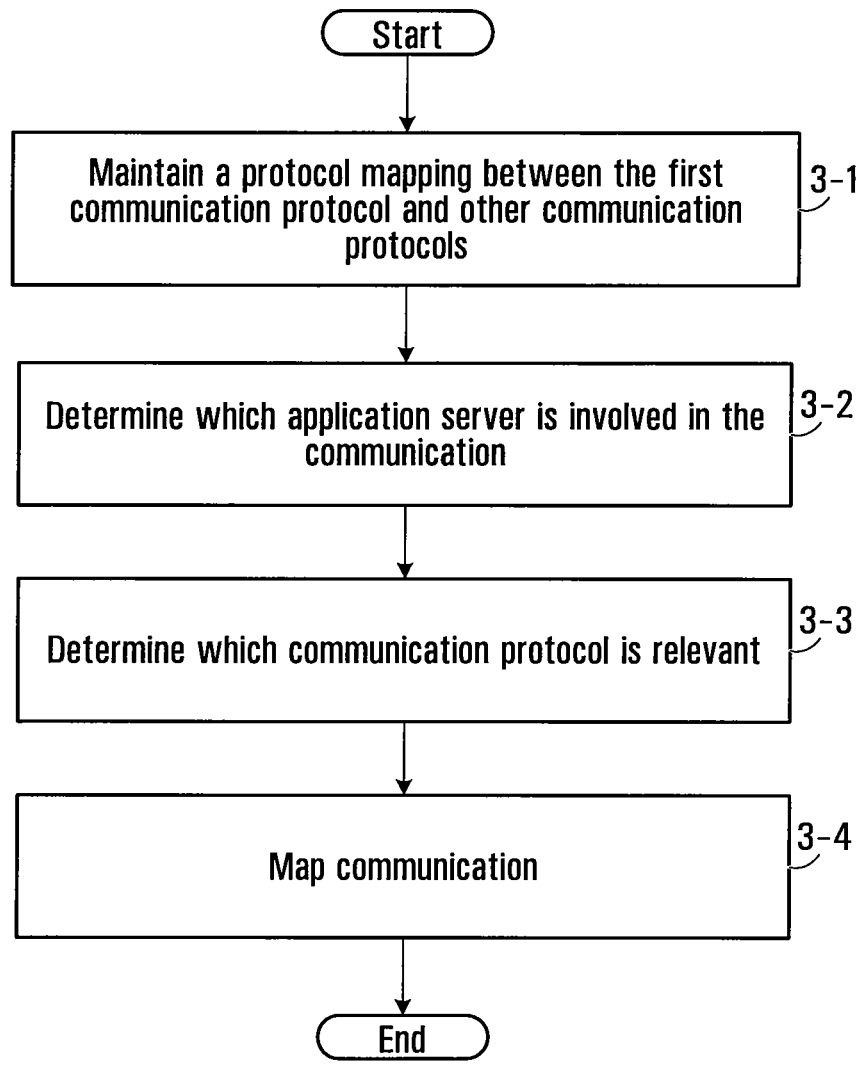

Referring now to FIGS. 2 and 3, shown are flowcharts of example methods of mapping communication between an application of a communications device and an application server. These methods may be implemented in a broker server of a communications network, for example by the protocol mapping function 22 of the broker server 20 shown in FIG. 1A. Alternatively, these methods may be implemented in a communications device, for example by the protocol mapping function 13 of the mobile device 16 shown in FIG. 1B. More generally, these methods may be implemented in any appropriate apparatus. These methods may be implemented separately, or in combination.

Referring first to FIG. 2, at step 2-1 the apparatus maintains a protocol mapping between a first communication protocol used by the application of the communications device, and a second communication protocol used by the application server. According to an embodiment of the application, the protocol mapping is based on a non-compiled editable file describing the protocol mapping. The apparatus maps communication between the application of the communications device and the application server using the protocol mapping. In some instances, as indicated at step 2-2, this involves mapping communication from the first communication protocol to the second communication protocol. In other instances, as indicated at step 2-3, this involves mapping communication from the second communication protocol to the first communication protocol. More generally, the mapping might involve one or more of mapping communication from the first communication protocol to the second communication protocol and mapping communication from the second communication protocol to the first communication protocol.

In some implementations, as indicated at step 2-4, the apparatus updates the protocol mapping by updating the non-compiled editable file without updating any compiled software. The protocol mapping might be updated for example if there are any changes to the communication protocols. Note that the protocol mapping can be updated without updating any compiled software because the protocol mapping is based on the non-compiled editable file. In specific implementations, the non-compiled editable file is an XML file. Alternative implementations for the non-compiled editable file have described above.

Note that the application server might be one of a plurality of application servers, each using one or more communication protocols. Therefore, the apparatus might determine which application server is involved in the communication and which communication protocol used by that application server is relevant for the protocol mapping. An example is provided below with reference to FIG. 3.

Referring now to FIG. 3, at step 3-1 the apparatus maintains a protocol mapping between the first communication protocol and other communication protocols used by application servers. According to an embodiment of the application, the protocol mapping is based on a non-compiled editable file describing the protocol mapping. At step 3-2, the apparatus determines which application server is involved in communication. Note that the application server might use more than one communication protocol. Therefore, in some implementations as indicated at step 3-3, the apparatus determines which one of the communication protocols of the application server is relevant for the protocol mapping. At step 3-4, the apparatus maps the communication between the application of the communications device and the application server using the protocol mapping. The protocol mapping is between the first communication protocol and the relevant communication protocol of the application server involved in the communication.

There are many ways for the apparatus to determine which application server is involved in communication. An example is provided below for the scenario where the apparatus performing protocol mapping is a broker server of a communications network. In some implementations, when the broker server receives a signal encoded using a first protocol from a communications device, the broker server uses an application identifier built into the first protocol to identify the application server. The broker server can also use a feature identifier built into a second protocol used by the application server to identify which feature resident on the application server is to be accessed. Further details of using feature identifiers to make such determinations is provided in commonly assigned European Patent Application No. 07105054.6 entitled "Methods and Systems to Allow Multiple SIP Applications on a SIP Client to Ability to Select Specific Applications and Features on a SIP Server", the disclosure of which is incorporated by reference.

It is to be understood that there are many possibilities for the first communication protocol and the second communication protocol. The communication protocols used can each be any implementation-specific protocol, for example, SIP, HTTP, or any other communication protocol. The communication protocols used might depend on the application server. In the examples present above with reference to FIGS. 2 and 3, the application server involved in the communication might for example be a media server. In this case, both the first communication protocol and the second communication protocol might be based on SIP. Alternatively, the application server involved in the communication might be a PBX. In this case, both the first communication protocol and the second communication protocol might be based on SIP. Alternatively, the application server involved in the communication might be a web server. In this case, the first communication protocol might be based on SIP while the second communication protocol might be based on HTTP. Other possibilities for the application server include a presence server and an Instant Messaging 'IM' server.

There are other possibilities for the application server and therefore there are many other possibilities for the first communication protocol and the second communication protocol. The first communication protocol and the second communication protocol might each be any one of a SIP, an HTTP, a SOAP, a Remote Method Invocation 'RMI', Remote Procedure Call 'RPC', a Computer Telephony Interface 'CTI', an ECMA 323, web service protocol, a Media Server Markup Language 'MSML', a Telephony Application Programming Interface 'TAPI', a Java Telephony Application Programming Interface 'JTAPI', and any appropriate proprietary protocol. The first communication protocol is based on SIP for specific implementations.

In the examples present above with reference to FIGS. 2 and 3, for scenarios where the protocol mapping is performed by the communications device, the communications device obtains the non-compiled editable file. There are many ways that the communications device can obtain the non-compiled editable file. In some implementations, the communications device downloads the non-compiled editable file. This might be initiated by the communications device. In other implementations, the communications device automatically receives the non-compiled editable file.

Specific examples of protocol mapping are provided below with reference to FIGS. 4 and 5.

Communication Protocol Mapping: Specific Examples

Referring now to FIG. 4, shown is a block diagram of yet another example wireless system 50. The wireless system 50 is provided as an example of multiple different protocol mappings by a broker server 55 of a wireless network. It is to be understood that the wireless system 50 is very specific for example purposes only.

The broker server 55 is connected to a transceiver 59, and a cellular network 51. The wireless system 50 has a plurality of mobile devices 54A,54B,54C for communicating with the cellular network 51 and/or the transceiver 59. The broker server 55 is also connected to a plurality of application servers including a plurality of PBXs 56A,56B,56C,56D, a plurality of Presence Servers 56E,56F,56G,56H, and a plurality of IM Servers 56I,56J. The connections between the broker server 55 and the other components 59,51,56A,56B,56C,56D,56E, 56F,56G,56H,56I,56J may be direct connections or indirect connections in which there is one or more intervening component (not shown). The broker server 55 has different types of protocol mappings including VoIP mapping 55A, cellular mobility mapping 55B, presence mapping 55C, and IM mapping 55D. The PBXs 56A,56B,56C,56D are coupled to a Public Switched Telephone network 'PSTN' 57. The Presence Servers 56E,56F,56G,56H and the IM Servers 56I,56J are connected to an Internet 58. The cellular network 51 is connected to the PSTN 57 via a circuit switched network (not shown).

In operation, the mobile devices 54A,54B,54C communicate using a communication protocol $cp_1$, which is SIP-based. However, each application server 56A, 56B, . . . , 56J communicates using one or more respective communication protocols $cp_2$, $cp_3$, . . . , $cp_8$. The broker server 55 performs protocol mapping between the device SIP $cp_1$ and the other communication protocols $cp_2$, $cp_3$, . . . , $cp_8$. The mapping is based on non-executable editable files that describe the protocol mapping. For example, there might be a respective XML file for each protocol mapping. Alternatively, there might be a respective XML file for each type of protocol mapping 55A,55B,55C,55D. Other implementations are possible. Details of protocol mapping have been provided already and are therefore not repeated here.

Figure 5A:
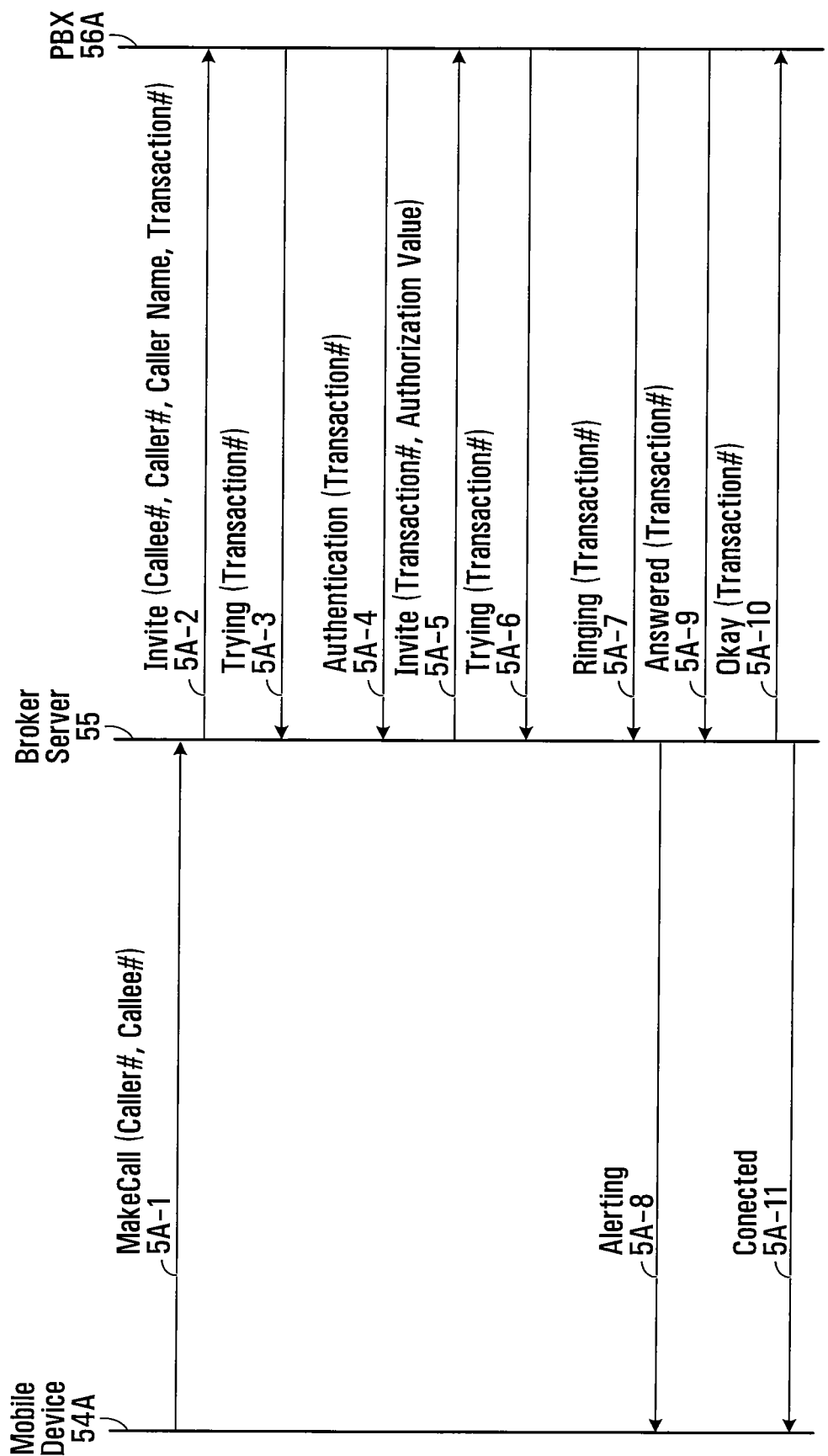
FIGS. 5A and 5B are signalling diagrams for an example protocol mapping performed by a broker server during establishment of a call.
Figure 5B:
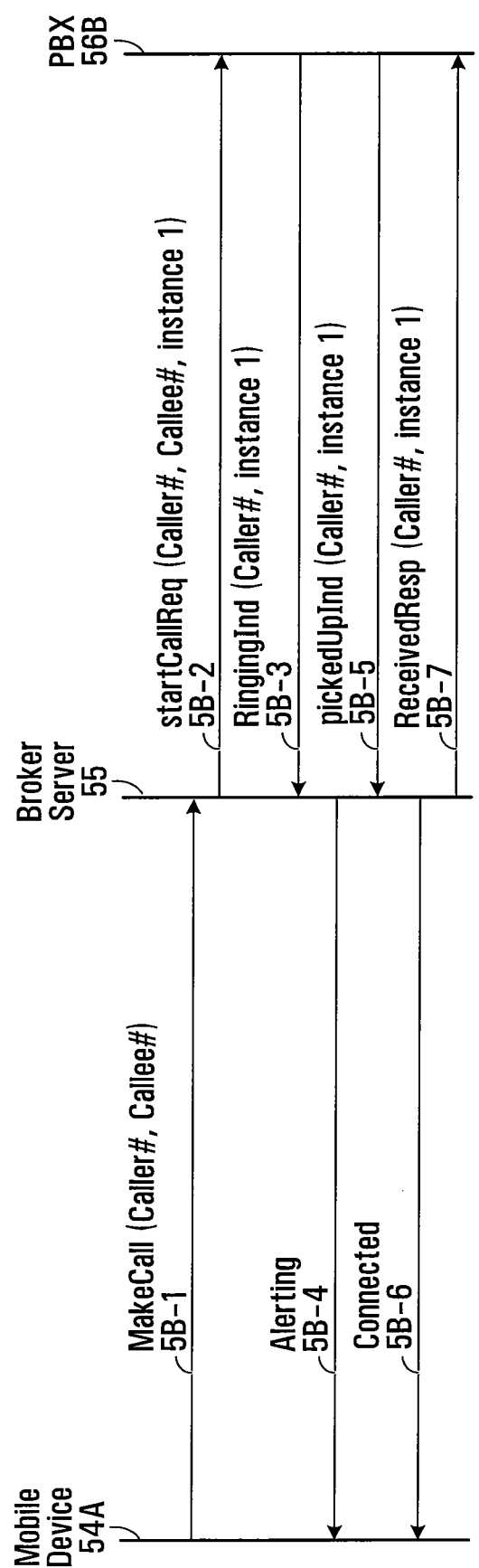

Referring now to FIGS. 5A and 5B, shown are signalling diagrams for example protocol mapping performed by the broker server 55 shown in FIG. 4 during establishment of a call. It is to be understood that these signalling diagrams are very specific for example purposes only.

The signalling diagrams include signals in respect of the mobile device 54A, the broker server 55, and the PBXs 56A, 56B shown in FIG. 4. FIG. 5A shows a first scenario for establishing a call with the first PBX 56A, while FIG. 5B shows a second scenario for establishing a call with a different PBX, namely the second PBX 56B. Note that in each scenario the signalling to and from the mobile device 54A is identical, while the signalling to and from the application servers 56A, 56B is quite different. This is because the application servers 56A,56B use different communication protocols. Details of the signalling for each scenario are provided below.

Referring first to FIG. 5A, at step 5A-1 the mobile device 54A sends a MakeCall message to the broker server 55 in order to request establishment of a call. In response, a plurality of signal exchanges occur between the broker server 55 and the PBX 56A. The signal exchanges include an Invite message at step 5A-2, a Trying message at step 5A-3, an Authentication message at step 5A-4, an Invite message at step 5A-5, and another Trying message at step 5A-6. At step 5A-7, the SIP server sends a Ringing message so as to indicate that the call is pending. At step 5A-8 an Alerting message is sent to the mobile device 54A to indicate that the call is pending. In this case, the recipient has answered the call and therefore an Answered message is issued at step 5A-9. Accordingly, the broker server 55 sends an Okay message to the PBX 56A at step 5A-10, and also sends a Connected message to the mobile device 54A at step 5A-11. Thus, the call has been established.

Referring now to FIG. 5B, at step 5B-1 the mobile device 54A sends a MakeCall message to the broker server 55 in order to request establishment of a call. In response, the broker server 55 sends a StartCallReq message to the PBX 56B at step 5B-2 in order to request establishment of the call. The PBX 56B sends a RingingInd message at step 5B-3 in order to indicate that the call is pending. At step 5B-4 an Alerting message is sent to the mobile device 54A to indicate that the call is pending. In this case, the recipient has answered the call and therefore a PickedUpInd message is issued at step 5B-5. Accordingly, the broker server 55 sends a Connected message to the mobile device 54A at step 5B-6, and also sends a ReceivedResp message to the PBX 56B at step 5B-7. Thus, the call has been established.

As can be seen in FIGS. 5A and 5B, the interface to the application servers 56A,56B differs not only in the flow, but in the parameter names, sequence identifiers, etc. The following XML excerpt shows how these differences can be described in such a way as to allow the broker server 55 to be implemented as a generic protocol machine. It is to be understood that the following XML excerpt is very specific for example purposes only.

```
<?xml version="1.0" encoding='utf-8'?>
<SipFlow xmlns:xsi="..."
xsi:noNamespaceSchemaLocation="SIP_flow.xsd">
    <Feature application="VoIP" feature="call_setup" PBX="Vendor1">
        <Protocol>protocol1.dll<\Protocol>
        <Callblock name="basic_invite" status="Manditory">
            <Frame name="invite" direction="from_broker">
                <Parameter>Callee Number<\Parameter>
                <Parameter>Caller Number<\Parameter>
                <Parameter>Callee Name<\Parameter>
                <Parameter>Transaction ID<\Parameter>
            <\Frame>
            <Frame name="trying" direction="to_broker">
                <Parameter>Transaction ID<\Parameter>
            <\Frame>
        </Callblock>
        <Callblock name = "authentication" status="optional">
            <frame name = "Authentication" direction="to_broker">
                <Parameter>Transaction ID<\Parameter>
            <\Frame>
            <Frame name="invite" ServerId="10" direction="from_broker">
                <Parameter>Authorization Value<\Parameter>
                <Parameter>Transaction ID<\Parameter>
            <\Frame>
            <Frame name="trying" direction="to_broker">
                <Parameter>Transaction ID<\Parameter>
            <\Frame>
        </Callblock>
        <Callblock name = "ringing" status="manditory">
            <frame name = "ringing" direction="to_broker">
                <Parameter>Transaction ID<\Parameter>
            <\Frame>
        </Callblock>
        <Callblock name = "answered" status="manditory">
            <frame name = "answered" direction="to_broker">
                <Parameter>Transaction ID<\Parameter>
            <\Frame>
        </Callblock>
        <Callblock name = "ack" status="manditory">
            <frame name = "okay" direction="from_broker">
                <Parameter>Transaction ID<\Parameter>
            <\Frame>
        </Callblock>
    </Feature>
    <Feature application="VoIP" feature="call_setup" PBX="Vendor2">
        <Protocol>protocol2.dll<\Protocol>
        <Callblock name="basic_invite" status="Manditory">
            <Frame name="startCallReq" direction="from_broker">
                <Parameter>ServerId<\Parameter>
                <Parameter>Callee Number<\Parameter>
                <Parameter>Caller Number<\Parameter>
                <Parameter>Instance Number<\Parameter>
            <\Frame>
        </Callblock>
        <Callblock name = "ringing" status="manditory">
            <frame name = "ringingInd" direction="to_broker">
                <Parameter>Caller Number<\Parameter>
                <Parameter>Instance Number<\Parameter>
            <\Frame>
        </Callblock>
        <Callblock name = "answered" status="manditory">
            <frame name = "answered" direction="to_broker">
                <Parameter>Caller Number<\Parameter>
                <Parameter>Instance Number<\Parameter>
            <\Frame>
        </Callblock>
        <Callblock name = "ack" status="manditory">
            <frame name = " ReceivedResp" direction="from_broker">
                <Parameter>Caller Number<\Parameter>
                <Parameter>Instance Number<\Parameter>
            <\Frame>
        </Callblock>
    </Feature>
</SipFlow>
```

With reference to the XML excerpt above, the following notes are made:

1. The 'Feature' field defines through the attributes the application, the feature and the vendor that this block of XML applies to. Note that PBX="Vendor1" corresponds to the first PBX 56A while PBX="Vendor2" corresponds to the second PBX 56B.

2. The 'Protocol' field describes the protocol being used. This is a dynamic downloadable library that implements the mechanics of the protocol.

3. The 'Callblock' fields describe the expected call flow. This tells the broker engine which signal to send at each stage of the call set up. Note that the attributes define if the call block is mandatory, conditional or optional.

4. For each call block, a Frame is described. The attributes describe the name that is used to access the DLL function and the direction of the signal.

5. For each frame, a Parameter field describes the order of parameters, either sourced from the original signal encoded as protocol 3 or stored locally on the broker.

Another Mobile Device

Figure 6:
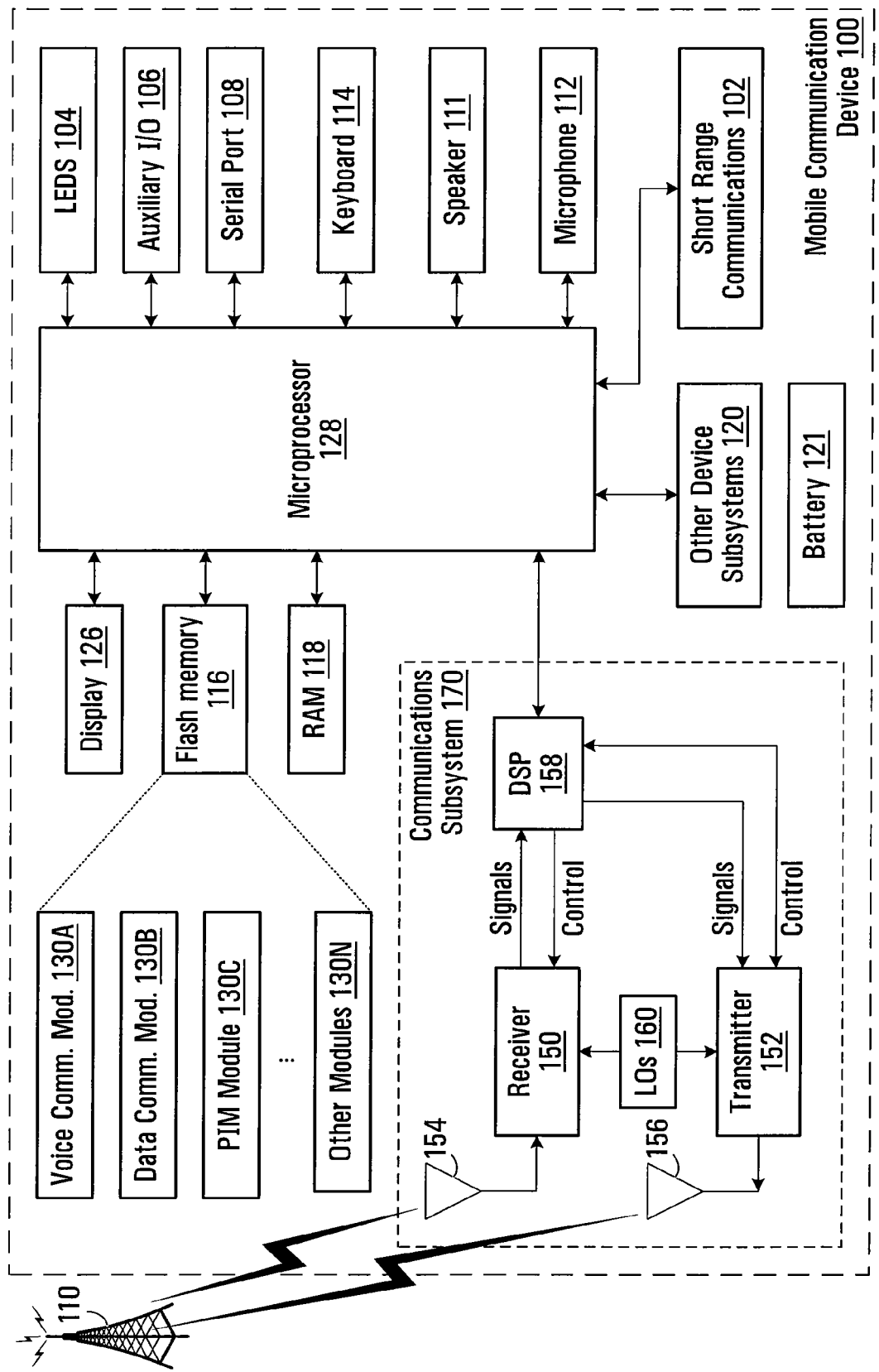
FIG. 6 is a block diagram of a mobile device.

Referring now to FIG. 6, shown is a block diagram of another mobile device 100 that may implement any of the mobile device methods described herein. The mobile device 100 is shown with specific components for implementing features similar to those of the mobile device 16 of FIG. 1B. It is to be understood that the mobile device 100 is shown with very specific details for example purposes only.

A processing device (a microprocessor 128) is shown schematically as connected between a keyboard 114 and a display 126. The microprocessor 128 is a type of processor with features similar to those of the processor 14 of the mobile device 16 shown in FIG. 1B. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A,130B,130C,130N of the flash memory 116 can be configured for implementing features similar to those of the protocol mapping function 13 of the mobile device 16 shown in FIG. 1B.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 15 of the mobile device 16 shown in FIG. 1B. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the application may be practised otherwise than as specifically described herein.

We claim:

1. A method of mapping communication between an application of a communications device and any one of a plurality of application servers of a communications network, the application of the communications device using a first communication protocol and each application server using a respective second communication protocol, the method being executed by a broker server of the communications network and comprising:
   maintaining a protocol mapping between the first communication protocol and each second communication protocol, the protocol mapping being based on a non-compiled editable file describing the protocol mapping;
   determining which application server is involved in the communication and which second communication protocol is used by that application server for the communication; and
   mapping communication between the application of the communications device and the application server involved in the communication using the protocol mapping between the first communication protocol and the second communication protocol used by that application server; and
   updating the protocol mapping by updating the non-compiled editable file to reflect any changes to the first communication protocol or the second communication protocol that have occurred without updating any compiled software;
   wherein determining which application server is involved in the communication comprises using an application identifier built into the first protocol to identify the application server among the plurality of application servers of the communications network.

2. The method of claim 1 wherein the non-compiled editable file is an Extensible Markup Language 'XML' file.

3. The method of claim 1 wherein mapping communication between the application of the communications device and the application server involved in the communication comprises at least one of:
   mapping communication that uses the first communication protocol to the second communication protocol; and
   mapping communication that uses the second communication protocol to the first communication protocol.

4. The method of claim 1 wherein the application server involved in the communication is a media server, both the first communication protocol and the second communication protocol being based on a Session Initiated Protocol 'SIP'.

5. The method of claim 1 wherein the application server involved in the communication is a Private Branch eXchange 'PBX', both the first communication protocol and the second communication protocol being based on SIP.

6. The method of claim 1 wherein the application server involved in the communication is a web server, the first communication protocol being based on SIP and the second communication protocol being based on a Hypertext Transfer Protocol 'HTTP'.

7. The method of claim 1 wherein the first communication protocol and the second communication protocol used for the communication are each any one of: a SIP, a Hypertext Transfer Protocol 'HTTP', a SOAP, a Remote Method Invocation 'RMI', Remote Procedure Call 'RPC', a Computer Telephony Interface 'CTI', an ECMA 323, web service protocol, a Media Server Markup Language 'MSML', a Telephony Application Programming Interface 'TAPI', and a Java Telephony Application Programming Interface 'JTAPI'.

8. The method of claim 7 wherein the first communication protocol is based on SIP.

9. A non-transitory computer readable medium having computer executable instructions stored thereon for execution on a processor so as to implement the method of claim 1.

10. The non-transitory computer readable medium of claim 9 further comprising the non-compiled editable file describing the protocol mapping.

11. A broker server of a communications network configured to map communication between an application of a communications device and any one of a plurality of application servers of the communications network, the application of the communications device using a first communication protocol and each application server using a respective second communication protocol, the broker server comprising:
    a processor; and
    a protocol mapping function configured for:
        maintaining a protocol mapping between the first communication protocol and each second communication protocol, the protocol mapping being based on a non-compiled editable file describing the protocol mapping;
        determining which application server is involved in the communication and which second communication protocol is used by that application server for the communication; and
        mapping communication between the application of the communications device and the application server involved in the communication using the protocol mapping between the first communication protocol and the second communication protocol used by that application server; and
        updating the protocol mapping by updating the non-compiled editable file to reflect any changes to the first communication protocol or the second communication protocol that have occurred without updating any compiled software;
    wherein the protocol mapping function is configured for determining which application server is involved in the communication by using an application identifier built into the first protocol to identify the application server among the plurality of application servers of the communications network.

12. The broker server of claim 11 wherein the protocol mapping function comprises the non-compiled editable file.

13. The broker server of claim 12 wherein the protocol mapping function further comprises protocol libraries providing basic building blocks for using both the first communication protocol and the second communication protocol.

* * * * *